US012709108B2

(12) United States Patent
Fukata et al.

(10) Patent No.: US 12,709,108 B2
(45) Date of Patent: Aug. 18, 2026

(54) IMAGE FORMATION CONTROL METHOD AND IMAGE FORMING APPARATUS

(71) Applicant: KYOCERA Document Solutions Inc., Osaka (JP)

(72) Inventors: Takuya Fukata, Osaka (JP); Hiroki Takehana, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 149 days.

(21) Appl. No.: 18/788,845

(22) Filed: Jul. 30, 2024

(65) Prior Publication Data

US 2025/0050663 A1 Feb. 13, 2025

(30) Foreign Application Priority Data

Aug. 8, 2023 (JP) ................................ 2023-128969

(51) Int. Cl.
*B41J 13/00* (2006.01)
*B41J 11/66* (2006.01)
*B41J 11/70* (2006.01)
*B41J 13/08* (2006.01)

(52) U.S. Cl.
CPC ......... *B41J 13/0018* (2013.01); *B41J 11/663* (2013.01); *B41J 11/70* (2013.01); *B41J 13/08* (2013.01)

(58) Field of Classification Search
CPC .......... B41J 11/663; B41J 15/04; B41J 11/70; B65H 2801/12; B26D 2007/005
See application file for complete search history.

(56) References Cited

U.S. PATENT DOCUMENTS

| | | | | |
|---|---|---|---|---|
| 5,829,897 A * | 11/1998 | Murai | B41J 2/36 | 400/621 |
| 6,382,850 B1 * | 5/2002 | Freund | B41J 11/663 | 400/70 |
| 6,923,534 B2 * | 8/2005 | Sai | B41J 11/663 | 347/101 |
| 12,053,975 B2 * | 8/2024 | Hada | B41J 11/007 | |
| 2005/0024464 A1 * | 2/2005 | Takagi | B41J 15/04 | 347/104 |
| 2006/0115313 A1 * | 6/2006 | Shaw, III | B41J 15/04 | 400/621 |
| 2010/0238251 A1 * | 9/2010 | Tsuzawa | B41J 11/0005 | 400/621 |

(Continued)

FOREIGN PATENT DOCUMENTS

JP 2004160666 A 6/2004

*Primary Examiner* — John P Zimmermann
(74) *Attorney, Agent, or Firm* — Alleman Hall LLP

(57) ABSTRACT

A roll paper supply device rolls out roll paper and cuts the rolled-out portion of the roll paper to produce a first sheet. A control device determines, for each print process, whether or not the roll paper supply device is in a specific state in which the roll paper supply device has conveyed the first sheet to a specific position. When it is determined that the roll paper supply device is in the specific state, the control device causes the roll paper supply device to execute a process of conveying the first sheet to a print position. When it is determined that the roll paper supply device is not in the specific state, the control device causes a cut sheet supply device to execute a process of conveying a second sheet to the print position.

4 Claims, 4 Drawing Sheets

(56) References Cited

U.S. PATENT DOCUMENTS

| | | | | |
|---|---|---|---|---|
| 2012/0148326 | A1 * | 6/2012 | Ipponyari | B41J 11/706 400/621 |
| 2012/0299991 | A1 * | 11/2012 | Wakita | B41J 11/663 347/16 |
| 2016/0101636 | A1 * | 4/2016 | Kanada | B41J 11/663 347/9 |

* cited by examiner

IMAGE FORMATION CONTROL METHOD AND IMAGE FORMING APPARATUS

INCORPORATION BY REFERENCE

This application is based upon and claims the benefit of priority from the corresponding Japanese Patent Application No. 2023-128969 filed on Aug. 8, 2023, the entire contents of which are incorporated herein by reference.

BACKGROUND

The present disclosure relates to an image forming apparatus including a device for cutting and supplying a portion of roll paper and a device for supplying a cut sheet, and an image formation control method for controlling the image forming apparatus.

The image forming apparatus includes a printing device that executes a print process. The print process is a process of forming an image on a sheet conveyed to a print position. The image forming apparatus may include a roll paper supply device and a cut sheet supply device.

The roll paper supply device rolls out roll paper, produces a sheet of a specific size by cutting the rolled-out portion of the roll paper, and conveys the produced sheet toward the print position.

The cut sheet supply device conveys a cut sheet accommodated in an accommodating portion toward the print position. The cut sheet is a sheet formed in advance to a standard size.

SUMMARY

An image formation control method according to one aspect of the present disclosure is a method for controlling an image forming apparatus. The image forming apparatus includes a roll paper supply device, a cut sheet supply device, and a printing device. The roll paper supply device can roll out roll paper, produce a first sheet of a specific size by cutting a rolled-out portion of the roll paper, and convey the first sheet toward a print position. The cut sheet supply device can convey a second sheet of the specific size accommodated in an accommodating portion toward the print position. The printing device can execute a print process of forming an image on the first sheet or the second sheet at the print position. The image formation control method is a control method performed when continuous print processing in which the print process is repeated a plurality of times is executed. The image formation control method includes determining, by a control device, whether or not the roll paper supply device is in a specific state in which the roll paper supply device has conveyed the first sheet to a specific position, for each of the printing processes. The image formation control method further includes causing, by the control device, the roll paper supply device to execute, for each of the print processes, a process of conveying the first sheet to the print position when it is determined that the roll paper supply device is in the specific state. The image formation control method further includes causing, by the control device, the roll paper supply device to execute, for each of the print processes, a process of conveying the second sheet to the print position when it is determined that the roll paper supply device is not in the specific state.

An image forming apparatus according to another aspect of the present disclosure includes the roll paper supply device, the cut sheet supply device, the printing device, and the control device configured to implement the image formation control method.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, an embodiment of the present disclosure will be described with reference to the drawings. It is noted that the following embodiment is an example of embodying the present disclosure and does not limit the technical scope of the present disclosure.

[Configuration of Image Forming Apparatus 10]

An image forming apparatus 10 according to the embodiment can execute a print process of forming an image on a sheet.

Figure 1:
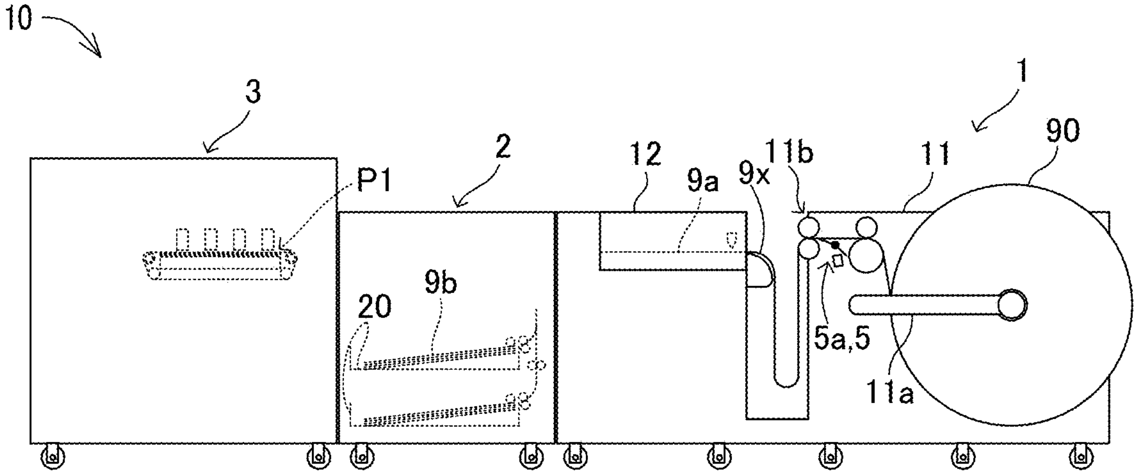
FIG. 1 is a schematic configuration diagram of an image forming apparatus according to an embodiment.

The image forming apparatus 10 includes a roll paper supply device 1, a cut sheet supply device 2, and a printing device 3. As shown in FIG. 1, the roll paper supply device 1, the cut sheet supply device 2, and the printing device 3 are provided.

The roll paper supply device 1 rolls out roll paper 90 and cuts the rolled-out portion of the roll paper 90 to produce a first sheet 9*a* of a specific size.

Further, the roll paper supply device 1 conveys the produced first sheet 9*a* toward a print position P1. The print position P1 is a position on a sheet conveying path in the printing device 3.

The roll paper supply device 1 includes a rollout device 11 that rolls out the roll paper 90 and a cutting device 12 that cuts the rolled-out portion 9*x* of the roll paper 90. The rolled-out portion 9*x* is a portion of the roll paper 90 that has been rolled out.

The rollout device 11 includes a roll paper support mechanism 11*a* and a rollout mechanism 11*b* (see FIG. 1). The roll paper support mechanism 11*a* rotatably supports the roll paper 90. The rollout mechanism 11*b* rolls out a portion of the roll paper 90 supported by the roll paper support mechanism 11*a*.

The cutting device 12 cuts the rolled-out portion 9*x* of the roll paper 90 to produce a first sheet 9*a*.

Figure 2:
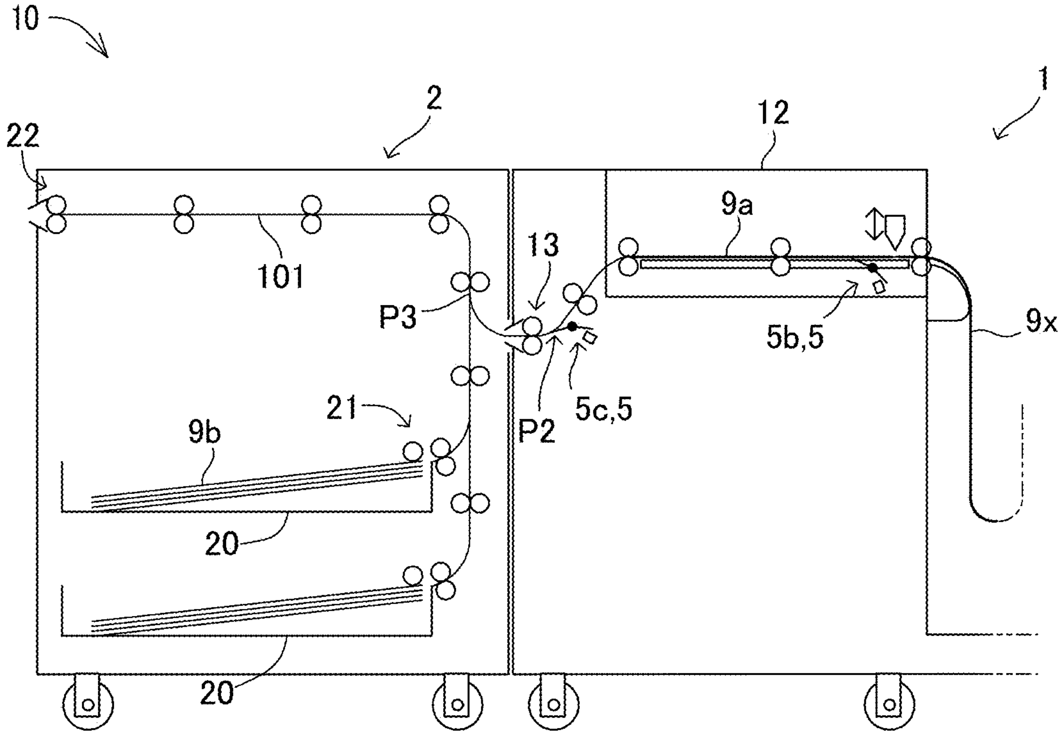
FIG. 2 is a configuration diagram of a part of a roll paper supply device and a cut sheet supply device in the image forming apparatus according to the embodiment.

The roll paper supply device 1 further includes a first feeding mechanism 13 (see FIG. 1 and FIG. 2). The first feeding mechanism 13 conveys the first sheet 9*a* to a pre-stage conveying path 101 in the cut sheet supply device 2. The pre-stage conveying path 101 is a part of the sheet conveying path toward the print position P1.

The cut sheet supply device 2 can convey a second sheet 9*b* of the specific size accommodated in one or more accommodating portions 20 toward the print position P1. The second sheet 9*b* is a cut sheet formed in advance to the specific size.

The cut sheet supply device 2 includes one or more accommodating portions 20, a second feeding mechanism 21, and a pre-stage conveying mechanism 22. The second feeding mechanism 21 conveys the second sheet 9*b* in the accommodating portion 20 to the pre-stage conveying path 101.

Figure 3:
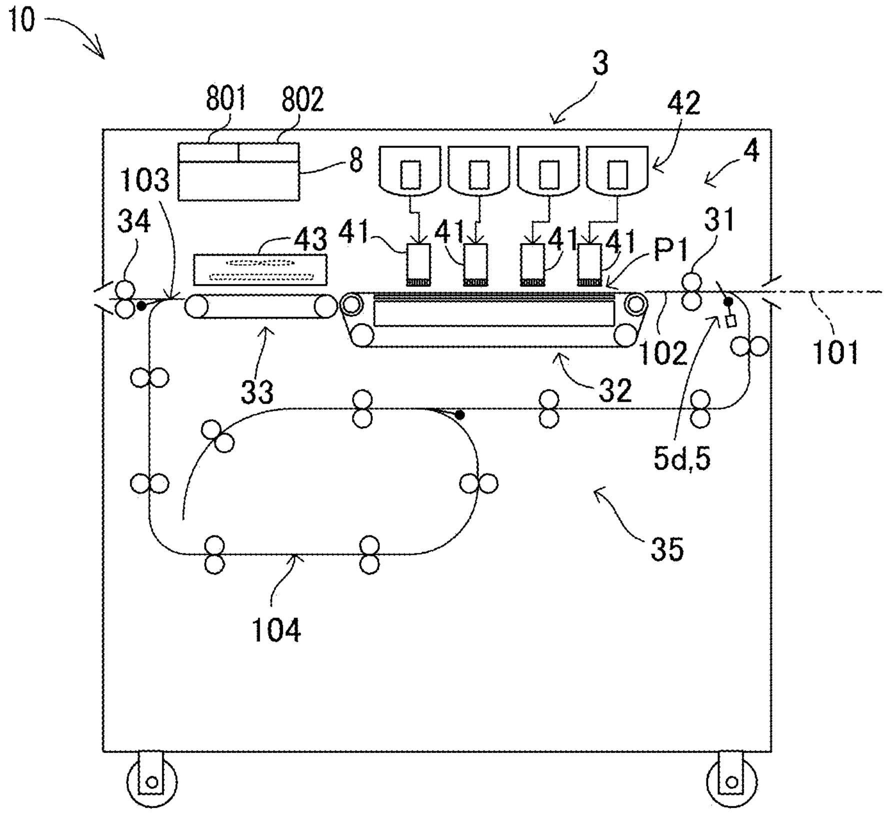
FIG. 3 is a configuration diagram of a printing device in the image forming apparatus according to the embodiment.

The pre-stage conveying mechanism 22 conveys the first sheet 9*a* or the second sheet 9*b* from the pre-stage conveying path 101 to a relay conveying path 102 in the printing device 3 (see FIG. 2 and FIG. 3).

The printing device 3 performs the print process on the first sheet 9*a* or the second sheet 9*b* at the print position P1.

The printing device 3 includes a relay conveying mechanism 31, a first belt conveying mechanism 32, a second belt conveying mechanism 33, a post-stage conveying mechanism 34, and an image forming portion 4 (see FIG. 3).

In the present embodiment, the printing device 3 executes the print process using an inkjet method. Therefore, the image forming portion 4 includes a plurality of inkjet units 41 and an ink supply portion 42. The image forming portion 4 also includes a drying device 43.

The relay conveying mechanism 31 conveys the first sheet 9*a* or the second sheet 9*b* conveyed into the relay conveying path 102 to the print position P1. The first belt conveying mechanism 32 conveys the first sheet 9*a* or the second sheet 9*b* at the print position P1.

Further, the first belt conveying mechanism 32 sends out the first sheet 9*a* or the second sheet 9*b* to the second belt conveying mechanism 33. The second belt conveying mechanism 33 conveys the first sheet 9*a* or the second sheet 9*b* to a post-stage conveying path 103.

The post-stage conveying mechanism 34 sends out the first sheet 9*a* or the second sheet 9*b* to a post-stage device connected subsequently to the printing device 3. For example, the post-stage device is a discharge tray, a post-processing device, or the like.

The post-processing device performs various types of post-processing on the first sheet 9*a* or the second sheet 9*b* on which an image has been formed. For example, the post-processing may be some or all of punching, stapling, and folding.

The plurality of inkjet units 41 form an ink image on the first sheet 9*a* or the second sheet 9*b* conveyed by the first belt conveying mechanism 32 by ejecting ink of different colors.

The ink supply portion 42 supplies the plurality of inkjet units 41 with ink of respective colors. The drying device 43 sends hot air to the ink image on the first sheet 9*a* or the second sheet 9*b* conveyed by the second belt conveying mechanism 33 to dry the ink image.

The printing device 3 further includes a reverse conveying mechanism 35 (see FIG. 3). When a double-sided print process is executed, the reverse conveying mechanism 35 conveys the first sheet 9*a* or the second sheet 9*b* from the post-stage conveying path 103 to the relay conveying path 102 via a reverse conveying path 104.

The reverse conveying mechanism 35 reverses the direction of the first sheet 9*a* or the second sheet 9*b* on the reverse conveying path 104, and conveys the reversed first sheet 9*a* or the second sheet 9*b* to the relay conveying path 102.

The image forming apparatus 10 further includes a plurality of sheet sensors 5 for detecting a sheet at a plurality of positions on the sheet conveying path, respectively (see FIG. 1 to FIG. 3).

For example, the plurality of sheet sensors 5 include a first sheet sensor 5*a*, a second sheet sensor 5*b*, a third sheet sensor 5*c*, and a fourth sheet sensor 5*d* (see FIG. 1 to FIG. 3).

The first sheet sensor 5*a* detects the sheet at a position between the roll paper support mechanism 11*a* and the cutting device 12 on the roll paper conveying path (see FIG. 1). The first sheet sensor 5*a* is used to determine whether or not the roll paper 90 is out of paper.

The second sheet sensor 5*b* detects the sheet at a specific position in the cutting device 12 on the roll paper conveying path (see FIG. 2). The second sheet sensor 5*b* is used for identifying the cut point of the rolled-out portion 9*x* of the roll paper 90.

The third sheet sensor 5*c* detects the first sheet 9*a* at a specific position P2 on the conveying path of the first sheet 9*a* (see FIG. 2). The specific position P2 is a position between the cutting device 12 and the pre-stage conveying path 101.

The fourth sheet sensor 5*d* detects the first sheet 9*a* or the second sheet 9*b* on the relay conveying path 102 (see FIG. 3). The fourth sheet sensor 5*d* is used to control the timing at which the first sheet 9*a* or the second sheet 9*b* is sent out to the print position P1 by the relay conveying mechanism 31.

The image forming apparatus 10 further includes an operation device 801, a display device 802, and a control device 8 (see FIG. 3). In the example shown in FIG. 3, the operation device 801, the display device 802, and the control device 8 are provided in the printing device 3.

However, some or all of the operation device 801, the display device 802, and the control device 8 may be provided in the roll paper supply device 1 or the cut sheet supply device 2.

The operation device 801 detects a human operation. For example, the operation device 801 includes a plurality of operation buttons and a touch panel. The display device 802 can display various types of information. For example, the display device 802 is a panel display device such as a liquid crystal display panel.

The control device 8 controls the roll paper supply device 1, the cut sheet supply device 2, and the printing device 3.

Figure 4:
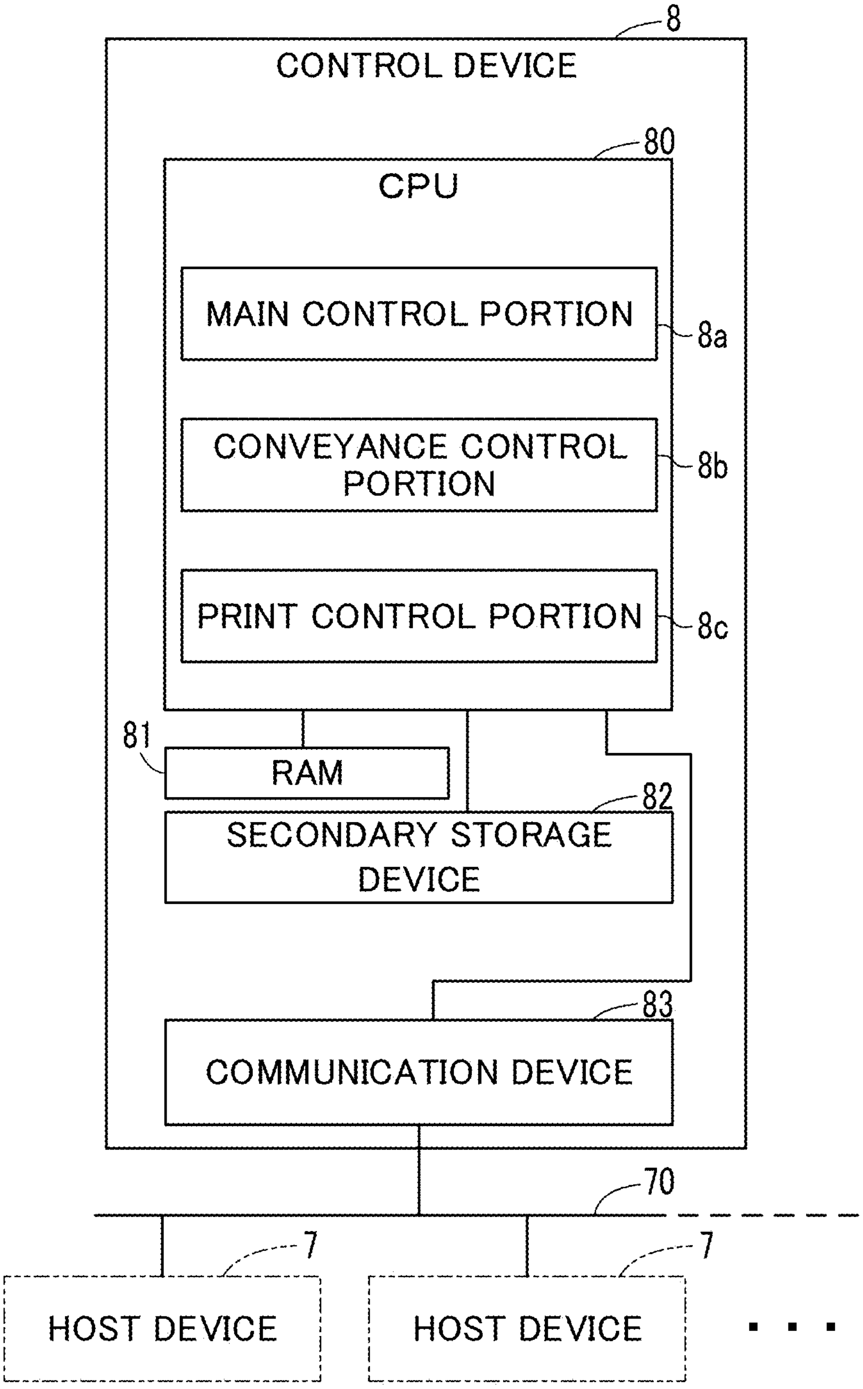
FIG. 4 is a block diagram showing a configuration of a control device in the image forming apparatus according to the embodiment.

As shown in FIG. 4, the control device 8 includes a central processing unit (CPU) 80, a random access memory (RAM) 81, a secondary storage device 82, a communication device 83, and the like.

The CPU 80 executes various types of control and data processing by executing computer programs. The RAM 81 temporarily stores the computer programs executed by the CPU 80 and various types of data.

The secondary storage device 82 is a computer-readable nonvolatile storage device. The secondary storage device 82 stores the computer programs executed by the CPU 80 and various types of data. For example, one or both of a flash memory and a hard disk drive are employed as the secondary storage device 82.

The communication device 83 executes communication with another device, such as a host device 7, through a network 70. The CPU 80 executes communication with another device through the communication device 83. The host device 7 is an information processing device that requests the image forming apparatus 10 to perform the print process.

The CPU 80 includes a plurality of processing modules implemented by executing the computer programs. The plurality of processing modules include a main control portion 8*a*, a conveyance control portion 8*b*, a print control portion 8*c*, and the like (see FIG. 4).

The main control portion 8*a* executes start control and the like for starting various processes in response to operations to the operation device 801 or processing requests received through the communication device 83.

The conveyance control portion 8*b* controls the rollout device 11 and the cutting device 12 to control the production of the first sheet 9*a*. Further, the conveyance control portion 8*b* controls the conveyance of the first sheet 9*a* and the second sheet 9*b* by controlling devices related to the conveyance of sheets in the first feeding mechanism 13, the cut sheet supply device 2, and the printing device 3.

The print control portion 8*c* causes the printing device 3 to execute the print process in synchronization with the conveyance of the first sheet 9*a* and the second sheet 9*b*. Further, the print control portion 8*c* controls the power supply to a heater of the drying device 43.

By the way, the user usually selects which of the first sheet 9*a* and second sheet 9*b* is to be used in the print process. When continuous print processing in which the print process is repeated a plurality of times is executed, the roll paper supply device 1 is often selected as the source of sheet supply.

While the continuous print processing is being executed, the roll paper supply device 1 may temporarily become unable to supply the first sheet 9*a*. For example, when the work of replenishing the roll paper 90 due to paper shortage or the work of clearing a jam of the roll paper 90 occurs, the roll paper supply device 1 is unable to supply the roll paper 90.

If a situation arises in which the roll paper supply device 1 is unable to supply the first sheet 9*a*, the productivity of the continuous print processing decreases.

In the present embodiment, the conveyance control portion 8*b* executes sheet supply control to be described later when the continuous print processing is executed. This makes it possible to maintain the productivity of the continuous print processing as much as possible even if the situation arises in which the roll paper supply device 1 is unable to supply the first sheet 9*a*.

[Sheet Supply Control]

Figure 5:
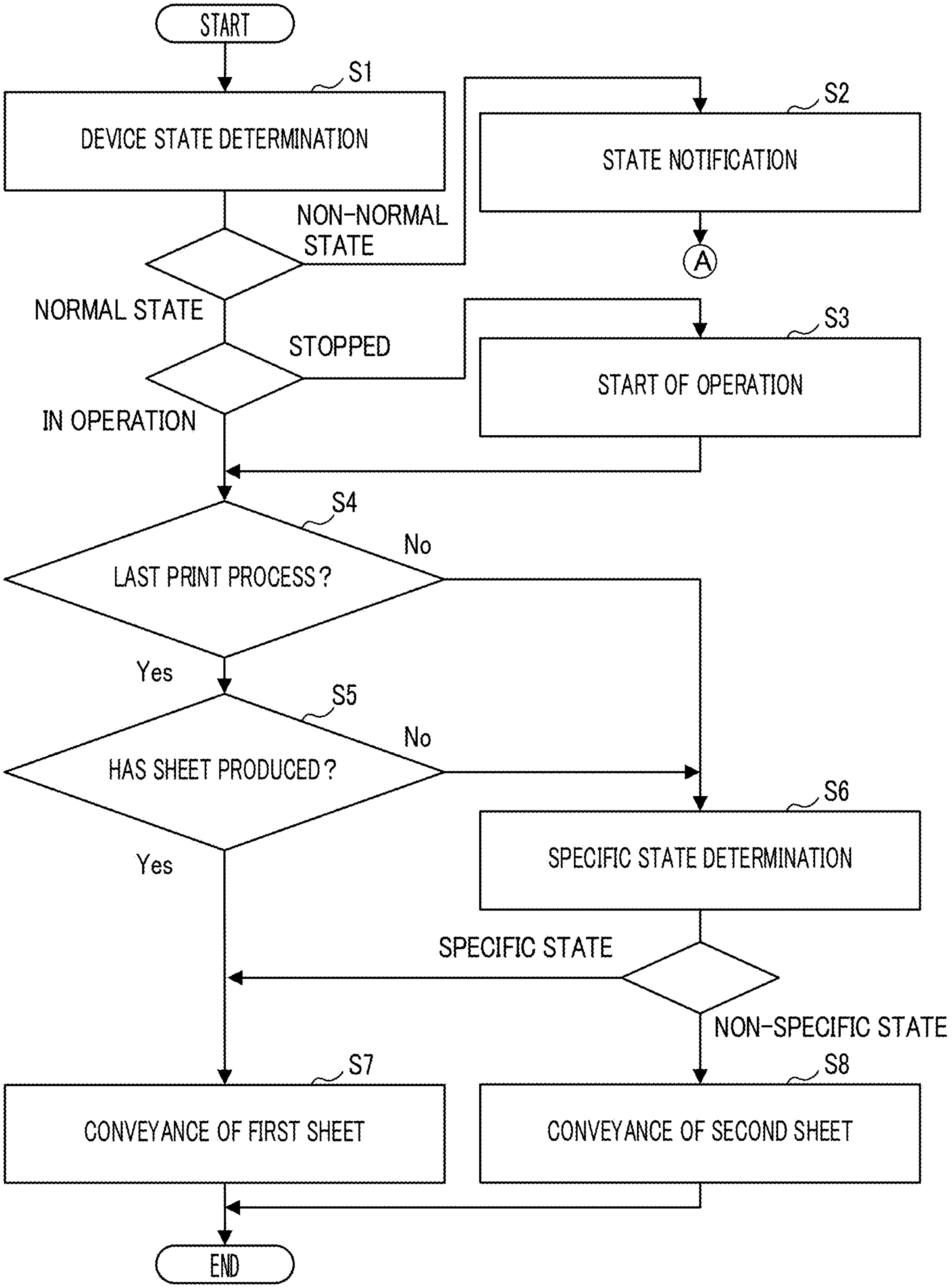
FIG. 5 is a flowchart showing an example of the procedure of sheet supply control in the image forming apparatus according to the embodiment.

An example of the procedure of the sheet supply control will be described below with reference to the flowchart shown in FIG. 5.

The conveyance control portion 8*b* starts the sheet supply control when the main control portion 8*a* receives a request for the continuous print processing through the communication device 83 or the operation device 801.

The sheet supply control is an example of the processing for implementing an image formation control method for controlling the image forming apparatus 10. The CPU 80, which includes the conveyance control portion 8*b*, is an example of the processor that implements the image formation control method.

In the following description, S1 to S8 represent identification codes of a plurality of steps in the sheet supply control. In the sheet supply control, the process of step S1 is executed first.

The conveyance control portion 8*b* executes the processes of steps S1 to S8 for each print process in the continuous print processing.

For example, the conveyance control portion 8*b* executes the processes of steps S1 to S8 for the first time when a request for the continuous print processing occurs. Further, the conveyance control portion 8*b* executes the processes of steps S1 to S8 at a timing corresponding to a predetermined sheet interval, every time the print process is executed.

<Step S1>

In step S1, the conveyance control portion 8*b* determines the state of the roll paper supply device 1.

Specifically, the conveyance control portion 8*b* determines whether the roll paper supply device 1 is in a normal state in which the roll paper supply device 1 is able to supply the first sheet 9*a*.

When it is determined that the roll paper supply device 1 is in the normal state, the conveyance control portion 8*b* determines whether the roll paper supply device 1 is in operation or stopped.

For example, the conveyance control portion 8*b* determines whether or not the roll paper supply device 1 is in the normal state in accordance with whether or not the detection states of the three sheet sensors 5*a* to 5*c* satisfy a sheet abnormality condition.

For example, the sheet abnormality condition includes a sheet out condition in which the first sheet sensor 5*a* does not detect the rolled-out portion 9*x* of the roll paper 90.

Further, the sheet abnormality condition may include a jam condition in which the detection result of the second sheet sensor 5*b* or the third sheet sensor 5*c* does not show a normal change in accordance with the operation of conveying the rolled-out portion 9*x* or the first sheet 9*a*.

Further, the roll paper supply device 1 may include a cover that can be opened and closed and a cover sensor for detecting the cover open state. The cover open state is a state in which the cover is opened. In this case, the conveyance control portion 8*b* determines that the roll paper supply device 1 is not in the normal state when the cover sensor detects the cover open state.

The conveyance control portion 8*b* executes the process of step S2 when it is determined that the roll paper supply device 1 is not in the normal state. The conveyance control portion 8*b* executes the process of step S3 when it is determined that the roll paper supply device 1 is in the normal state and that the roll paper supply device 1 is stopped.

On the other hand, the conveyance control portion 8*b* executes the process of step S4 when it is determined that the roll paper supply device 1 is in the normal state and that the roll paper supply device 1 is in operation.

<Step S2>

In step S2, the conveyance control portion 8*b* executes a state notification process of notifying the user of the state determined in step S1.

For example, the conveyance control portion 8*b* notifies, through the communication device 83, the host device 7 of a message indicating the state determined in step S1. Alternatively, the conveyance control portion 8*b* notifies the user of the message through the display device 802.

The conveyance control portion 8*b* executes the process of step S8 after executing the process of step S2.

<Step S3>

In step S3, the conveyance control portion 8*b* causes the roll paper supply device 1 to start operation. Thus, the roll paper supply device 1 sequentially executes the rollout process of the roll paper 90, the cutting process of the rolled-out portion 9*x*, and the conveying process of the first sheet 9*a* in accordance with the detection states of the three sheet sensors 5*a* to 5*c*.

The conveyance control portion 8*b* executes the process of step S4 after executing the process of step S3.

<Step S4>

In step S4, the conveyance control portion 8*b* selects the next process in accordance with whether or not the print process to be executed is the last print process in the continuous print processing.

When the print process to be executed is the last print process, the conveyance control portion 8*b* executes the process of step S5. On the other hand, when the print process to be executed is not the last print process, the conveyance control portion 8*b* executes the process of step S6.

<Step S5>

In step S5, the conveyance control portion 8*b* determines whether or not the roll paper supply device 1 is in a sheet produced state. The sheet produced state is a state in which the first sheet 9*a* has already been produced by the roll paper supply device 1.

The conveyance control portion 8*b* determines whether or not the roll paper supply device 1 is in the sheet produced state in accordance with the detection states of the second sheet sensor 5*b* and the third sheet sensor 5*c* and the operation record of the cutting device 12.

The conveyance control portion 8*b* determines that the roll paper supply device 1 is in the sheet produced state every time the cutting device 12 executes a cutting operation in a state in which the rolled-out portion 9*x* is detected by the second sheet sensor 5*b*.

On the other hand, the conveyance control portion 8*b* determines that the roll paper supply device 1 is not in the sheet produced state every time the third sheet sensor 5*c* changes from the state of detecting the first sheet 9*a* to the state of not detecting the first sheet 9*a*.

When it is determined that the roll paper supply device 1 is in the sheet produced state, the conveyance control portion 8*b* executes the process of step S7. On the other hand, when it is determined that the roll paper supply device 1 is not in the sheet generated state, the conveyance control portion 8*b* executes the process of step S6.

<Step S6>

In step S6, the conveyance control portion 8*b* determines whether or not the roll paper supply device 1 is in a specific state in which the roll paper supply device 1 has conveyed the first sheet 9*a* to the specific position P2.

The specific state is a state in which the first sheet 9*a* has reached the specific position P2. The non-specific state, which is not the specific state, is a state in which the first sheet 9*a* has not reached the specific position P2.

The conveyance control portion 8*b* determines that the roll paper supply device 1 is in the specific state when the first sheet 9*a* is detected by the third sheet sensor 5*c*. On the other hand, when the first sheet 9*a* is not detected by the third sheet sensor 5*c*, the conveyance control portion 8*b* determines that the roll paper supply device 1 is not in the specific state.

The conveyance control portion 8*b* executes the process of step S7 when it is determined that the roll paper supply device 1 is in the specific state. On the other hand, the conveyance control portion 8*b* executes the process of step S8 when it is determined that the roll paper supply device 1 is not in the specific state.

<Step S7>

In step S7, the conveyance control portion 8*b* causes the first feeding mechanism 13 of the roll paper supply device 1 to convey the first sheet 9*a* toward the print position P1. Thus, the first sheet 9*a* is conveyed to the print position P1 by the pre-stage conveying mechanism 22 and the relay conveying mechanism 31, and an image is formed on the first sheet 9*a*.

After executing the process of step S7, the conveyance control portion 8*b* ends the sheet supply control corresponding to one print process.

<Step S8>

In step S8, the conveyance control portion 8*b* causes the second feeding mechanism 21 of the cut sheet supply device 2 to execute a process of conveying the second sheet 9*b* toward the print position P1. Thus, the second sheet 9*b* is conveyed to the print position P1 by the pre-stage conveying mechanism 22 and the relay conveying mechanism 31, and an image is formed on the second sheet 9*b*.

After executing the process of step S8, the conveyance control portion 8*b* ends the sheet supply control corresponding to one print process.

Here, the period from when the control device 8 receives a request for the continuous print processing to when the last print process in the continuous print processing is executed is referred to as a sheet feed operation period.

The conveyance control portion 8*b* repeatedly executes the processes of steps S1 to S8 for each print process during the sheet feed operation period. As described above, the process of step S1 includes a process of determining whether or not the roll paper supply device 1 is in the normal state.

By executing the process of step S3, the conveyance control portion 8*b* causes the roll paper supply device 1 to repeatedly execute a first sheet preparation process when it is determined that the roll paper supply device 1 is in the normal state during the sheet feed operation period. The first sheet preparation process is a process of producing the first sheet 9*a* and conveying the first sheet 9*a* to the specific position P2.

By executing the sheet supply control, the productivity of the continuous print processing is maintained even in the event that the roll paper supply device 1 is not in the normal state.

In addition, the conveyance control portion 8*b* executes the process of step S5 when the last print process in the continuous print processing is executed. In step S5, when it is determined that the roll paper supply device 1 is in the sheet produced state, the conveyance control portion 8*b* causes the roll paper supply device 1 to execute the process of step S7 regardless of the conveyance position of the first sheet 9*a*.

Accordingly, it is avoided that the produced first sheet 9*a* remains in the roll paper supply device 1 in vain when the continuous print processing is completed.

[Application Example]

In the image forming apparatus 10 described above, the printing device 3 executes the print process using an inkjet method. However, an apparatus that executes the print process using another method such as an electrophotographic method may be employed as the printing device 3.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image formation control method for controlling an image forming apparatus including: a roll paper supply device configured to roll out roll paper and cut a rolled-out portion of the roll paper to produce a first sheet of a specific size, and convey the first sheet to a specific conveying path; a cut sheet supply device configured to convey a second sheet cut to the specific size in advance and accommodated in an accommodating portion to the specific conveying path; a printing device configured to execute a print process of forming an image on the first sheet or the second sheet conveyed through the specific conveying path to a print position; and a sensor configured to detect the first sheet at a specific position between a position at which the roll paper is cut in the roll paper supply device and the specific conveying path, the image formation control method comprising:

when continuous print processing in which the print process is repeated a plurality of times is executed, determining, by a control device based on a detection state of the sensor, whether or not the roll paper supply device is in a specific state in which the roll paper supply device has conveyed the first sheet to the specific position, for each of the print processes;

causing, by the control device, the roll paper supply device to execute a process of conveying the first sheet toward the print position when it is determined that the roll paper supply device is in the specific state, for each of the print processes; and causing, by the control device, the cut sheet supply device to execute a process of conveying the second sheet toward the print position when it is determined that the roll sheet supply device is not in the specific state, for each of the print processes.

2. The image formation control method according to claim 1, further comprising:

determining, by the control device, whether or not the roll paper supply device is in a sheet produced state in which the roll paper supply device has already produced the first sheet when a last print process of the print processes in the continuous print processing is executed; and causing, by the control device, the roll paper supply device to execute a process of conveying the first sheet toward the print position regardless of a conveyance position of the first sheet when it is determined that the roll paper supply device is in the sheet produced state when a last print process of the print processes in the continuous print processing is executed.

3. The image formation control method according to claim 1, further comprising:

repeatedly determining, by the control device, whether or not the roll paper supply device is in a normal state in which the roll paper supply device is able to supply the first sheet in a sheet feed operation period from when the control device receives a request for the continuous print processing to when a last print process of the print processes in the continuous print processing is executed; and repeatedly causing, by the control device, the roll paper supply device to execute a process of producing the first sheet and conveying the first sheet to the specific position when it is determined that the roll paper supply device is in the normal state during the sheet feed operation period.

4. An image forming apparatus comprising:

a roll paper supply device configured to roll out roll paper and cut a rolled-out portion of the roll paper to produce a first sheet of a specific size, and convey the first sheet to a specific conveying path;

a cut sheet supply device configured to convey a second sheet cut to the specific size in advance and accommodated in an accommodating portion to the specific conveying path;

a printing device configured to execute a print process of forming an image on the first sheet or the second sheet conveyed through the specific conveying path to a print position;

a sensor configured to detect the first sheet at a specific position between a position at which the roll paper is cut in the roll paper supply device and the specific conveying path; and a control device configured to implement the image formation control method according to claim 1.

* * * * *